United States Patent
Baugher et al.

(10) Patent No.: US 7,912,217 B2
(45) Date of Patent: Mar. 22, 2011

(54) CUSTOMIZED ADVERTISEMENT SPLICING IN ENCRYPTED ENTERTAINMENT SOURCES

(75) Inventors: Mark J. Baugher, Portland, OR (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 993 days.

(21) Appl. No.: 11/688,609

(22) Filed: Mar. 20, 2007

(65) Prior Publication Data

US 2008/0235722 A1 Sep. 25, 2008

(51) Int. Cl.
*H04N 7/167* (2006.01)
(52) U.S. Cl. .......... 380/200; 380/259; 380/42; 380/277; 380/255; 713/168; 725/32
(58) Field of Classification Search .................. 713/168; 725/32; 380/255, 228, 200, 259, 277
See application file for complete search history.

(56) References Cited

U.S. PATENT DOCUMENTS

| | | | |
|---|---|---|---|
| 7,110,006 B2 | 9/2006 | Macinnis et al. | |
| 7,802,277 B2* | 9/2010 | Medford | 725/25 |
| 2002/0150244 A1* | 10/2002 | Kim et al. | 380/201 |
| 2003/0061607 A1 | 3/2003 | Hunter et al. | |
| 2004/0003398 A1* | 1/2004 | Donian et al. | 725/34 |
| 2004/0040035 A1* | 2/2004 | Carlucci et al. | 725/32 |
| 2004/0189873 A1* | 9/2004 | Konig et al. | 348/607 |
| 2004/0194130 A1* | 9/2004 | Konig et al. | 725/32 |
| 2006/0029093 A1* | 2/2006 | Van Rossum | 370/432 |
| 2006/0034458 A1* | 2/2006 | Kim et al. | 380/201 |
| 2006/0037041 A1 | 2/2006 | Zhang | |
| 2006/0039565 A1* | 2/2006 | Kim et al. | 380/277 |
| 2006/0075449 A1 | 4/2006 | Jagadeesan et al. | |
| 2007/0098165 A1* | 5/2007 | Yoshikawa | 380/211 |
| 2007/0192789 A1* | 8/2007 | Medford | 725/31 |
| 2007/0220545 A1* | 9/2007 | Awano | 725/34 |

(Continued)

FOREIGN PATENT DOCUMENTS

WO WO 01/57757 8/2001

(Continued)

OTHER PUBLICATIONS

Schulzrinne et al.; "RTP: A Transport Protocol for Real-Time Applications"; Network Working Group RFC: 3550; http://www.apps.ieft.org/rfc/rfc3550.html; (pp. 1-84); Jul. 2003.

(Continued)

*Primary Examiner* — David García Cervetti
(74) *Attorney, Agent, or Firm* — Haynes and Boone, LLP.

(57) ABSTRACT

In one embodiment, a method includes receiving gap information from an entertainment content source configured to provide an entertainment stream associated with a contributing source information providing a source of the entertainment stream and a chronological order to render the entertainment stream, the entertainment stream being encrypted and having an associated first decryption key multiplexed into a key distribution system, the gap information identifying a gap in the entertainment stream where an ad may be one of inserted or substituted, synchronizing a target ad from an advertisement stream to a time base corresponding to the gap, decrypting the entertainment stream using the first decryption key selected from the key distribution system based on the contributing source information, and rendering the entertainment stream and the target ad as a composite stream based on the chronological order, the target ad being rendered during the gap in the entertainment stream.

17 Claims, 3 Drawing Sheets

U.S. PATENT DOCUMENTS

| | | | |
|---|---|---|---|
| 2007/0220575 A1* | 9/2007 | Cooper et al. | 725/118 |
| 2007/0258586 A1* | 11/2007 | Huang et al. | 380/201 |
| 2008/0127246 A1* | 5/2008 | Sylvain | 725/32 |
| 2009/0199236 A1* | 8/2009 | Barrett et al. | 725/36 |
| 2010/0223111 A1* | 9/2010 | Maekawa | 705/14.4 |

FOREIGN PATENT DOCUMENTS

| | | |
|---|---|---|
| WO | WO 01/93474 | 12/2001 |

OTHER PUBLICATIONS

Baugher et al.; "The Secure Real-Time Transport Protocol (SRTP)"; Network Working Group RFC: 3711; http://www.apps.ietf.org/rfc/rfc3711.html; (pp. 1-45); Mar. 2004.

Handley et al.; "SDP: Session Description Protocol"; Network Working Group RFC: 4566; http://www.apps.ietf.org/rfc/rfc4566.txt; (pp. 1-46); Jul. 2006.

Krawczyk et al.; "HMAC: Keyed-Hashing for Message Authentication"; Network Working Group RFC: 2104; http://www.apps.ietf.org/rfc/rfc2104.txt; (pp. 1-11); Feb. 1997.

Baugher et al.; "The Group Domain of Interpretation"; Network Working Group RFC: 3547; http://www.apps.ietf.org/rfc/rfc3547.html; (pp. 1-40); Jul. 2003.

Baugher et al.; "GDOI Key Establishment for SRTP"; http://tools.ietf.org/wg/msec/draft-baugher-msec-gdoi-srtp-00.txt; (pp. 1-10); Oct. 2006.

D. Singer; "Associating Time-Codes with RTP Streams"; draft-ietf-avt-smpte-rtp-07.txt; (pp. 1-18); Dec. 8, 2006.

Internet Streaming Media Alliance; "Internet Streaming Media Alliance Implementation Specification"; Version 2.0; www.isma.tv; (pp. 1-16); Apr. 2005.

* cited by examiner

CUSTOMIZED ADVERTISEMENT SPLICING IN ENCRYPTED ENTERTAINMENT SOURCES

TECHNICAL FIELD

The present disclosure relates generally to media delivery, and more particularly to customized advertisement splicing that may multiplex one or more encrypted sources and keys.

BACKGROUND

Television and/or radio operators and their advertisers may benefit when a commercial advertisement (an ad) can be targeted to a specific audience. For example, it may be financially advantageous to insert customized or local television (TV) ads into entertainment or news programming at local broadcast stations, or even to insert custom ads at a metropolitan media head end in the case of cable television. Media delivery may include the broadcast and reception of a video or an audio program. A video program may include video samples comprising a television, cable, or satellite broadcast. Similarly, an audio program may include audio samples comprising a radio broadcast or a public address broadcast. Some media broadcasters charge media recipients directly, and may use a "pay per view" revenue model where access to a particular program is granted, or they may use a subscription revenue model where access is granted for a period of time based on the subscription agreement. In order to prevent reception of a broadcast by an unauthorized recipient it is now common to encrypt or "scramble" the program data so that only authorized receivers (i.e. those who have paid) will be granted access.

The insertion of an advertisement into a program can be termed ad splicing, which is increasingly considered an important source of revenue for media broadcasters. However, encryption of media content has complicated the implementation of ad splicing. Currently, custom ads are multiplexed into a program that may be scrambled or encrypted using a conditional access system (CAS), since the CAS is typically local and co-resident with the ad multiplexing. To simplify decryption, both the program content and the advertising content are typically encrypted together.

DESCRIPTION

Overview

Owing to the trends of fine-grained targeting of ads to specific neighborhoods or affinity groups and the application of conditional access farther from the local delivery service, one or more embodiments provide a novel method where ad content may be sent as a separate stream that is multiplexed with entertainment content in an endpoint that resolves the problem of signaling and multiplexing of keys for different content sources sent as either packetized or non-packetized data. This novel method may be applied to a variety of Motion Picture Experts Group (MPEG) and Internet Protocol (IP) systems that include legacy as well as new equipment in the home and allows custom ad insertion by network-oriented devices without the need for complicated and expensive video processing to perform the stream multiplexing/switching associated with ad splicing.

In accordance with an embodiment, a method includes receiving gap information from an entertainment content source configured to provide an entertainment stream associated with a contributing source information providing a source of the entertainment stream and a chronological order to render the entertainment stream, the entertainment stream being encrypted and having an associated first decryption key multiplexed into a key distribution system, the gap information identifying a gap in the entertainment stream where an ad may be one of inserted or substituted, synchronizing a target ad from an advertisement stream to a time base corresponding to the gap, decrypting the entertainment stream using the first decryption key selected from the key distribution system based on the contributing source information, and rendering the entertainment stream and the target ad as a composite stream based on the chronological order, the target ad being rendered during the gap in the entertainment stream.

In accordance with another embodiment, an apparatus includes a cryptographic key source and a synchronization unit. The cryptographic key source is configured to receive and supply one or more keys including a first key. The synchronization unit is configured to receive gap information from an entertainment content source configured to provide an entertainment stream associated with a contributing source information providing a source of the entertainment stream and a chronological order for rendering the entertainment stream, the entertainment stream being encrypted and configured for decryption using the first key, the gap information identifying a gap in the entertainment stream where an ad may be one of inserted or substituted, the synchronization unit being configured to receive ad information from an advertisement content source identifying at least the duration of a target ad, the advertisement content source including a target ad having ad information that is compatible with the gap information, the synchronization unit being configured to provide ad sync information for modifying the chronological order of the target ad to coincide with the gap, the first key being selected from the cryptographic key source and used to decrypt the entertainment stream based on the source of the entertainment stream, wherein a composite stream of the decrypted entertainment stream and the target ad is rendered based on the chronological order, the target ad being rendered during the gap in the entertainment stream.

In accordance with yet another embodiment, an apparatus includes a key distribution means and a synchronization means. The key distribution means provides a means for distributing one or more cryptographic keys including a first key, where the key distribution means supports Group Domain of Interpretation (GDOI). The synchronization means provides a means for receiving gap information from an entertainment content source configured to provide an entertainment stream associated with a contributing source information providing a source of the entertainment stream and a chronological order for rendering the entertainment stream, the entertainment stream being encrypted and configured for decryption using the first key, the gap information identifying a gap in the entertainment stream where an ad may be one of inserted or substituted, the synchronization means for receiving ad information from an advertisement content source identifying at least the duration of a target ad, the advertisement content source including a target ad having ad information that is compatible with the gap information, the synchronization means for providing ad sync information for modifying the chronological order of the target ad to coincide with the gap, the first key being selected from the cryptographic key source and used to decrypt the entertainment stream based on the chronological order, wherein a composite stream of the decrypted entertainment stream and the target ad is rendered based on the source of the entertainment stream, GDOI being used to bind the decryption keys to source identifiers of each stream, the target ad being rendered during the gap in the entertainment stream. In this manner, the custom ad may be retained as a recognizable, separate block of content that is either encrypted with its own key or is unencrypted, and where the custom ad may be explicitly identified at the packet level.

Description

Example Embodiments

Media delivery includes all the various transmission and broadcast methods such as over the air (OTA) broadcasting of television and radio programs, cable systems, Broadband Internet distribution, and satellite broadcast, and may include any number of revenue models such as advertiser sponsored, pay-per-view (PPV), Video-on-Demand (VoD), and subscription services. The recent explosion of broadband Internet services has allowed direct and controlled delivery of media services to users worldwide. In particular, VoD content typically comes "pre-encrypted" for playout from the VoD server and may present difficulties when integrating content from various sources, even when the integration is done by the VoD server itself.

Media delivery is changing in ways that are problematic to custom "ad splicing". One trend is to target ads to specific neighborhoods. A second trend reflects the desire of national TV operators to move functions such as those performed by a conditional access system (CAS) to national or regional head ends to reduce the amount of equipment, operational support and expertise that is needed in the local area. Another trend is the move to earth-bound networks, as opposed to satellite delivery, and the concomitant need to encrypt TV programming prior to delivery over a wide area Internet Protocol (IP) network. Increasingly, IP is used to transport TV content (IPTV) over the backbone, and it is reasonable to expect this trend to reach the home in the coming years for a new type of end-to-end IP service.

Many conditional access systems are proprietary and their details are not disclosed publicly. Digital Video Broadcast (DVB) and American Television Systems Committee (ATSC) systems, however, support a common interface for signaling encryption of data so that vendors of multiplexing systems can work with a variety of proprietary CAS products. The DVB system has standardized a common means of conveying authorization keys in Entitlement Management Messages (EMM) and for conveying keys to encrypted-program content in Entitlement Control Messages (ECM).

For IP delivery, the Internet Streaming Media Alliance (ISMA) has standardized an MPEG-4 Authentication and Encryption system, referred to as ISMAcrypt, that allows segments of a media stream to signal "selective encryption" whereby certain parts of the stream (i.e. certain MPEG-4 "access units") are encrypted and others are not. Legacy home TV devices, including settop boxes, might not support selective encryption. A solution for legacy TV devices is to encrypt the ads and allow the CAS system in those devices to decrypt the ads using a separate key. However, ISMAcrypt lacks any means of signaling a multiplex in which certain content from one source (i.e. TV programming) can be differentiated from that of another source (i.e. custom ads).

Figure 1:
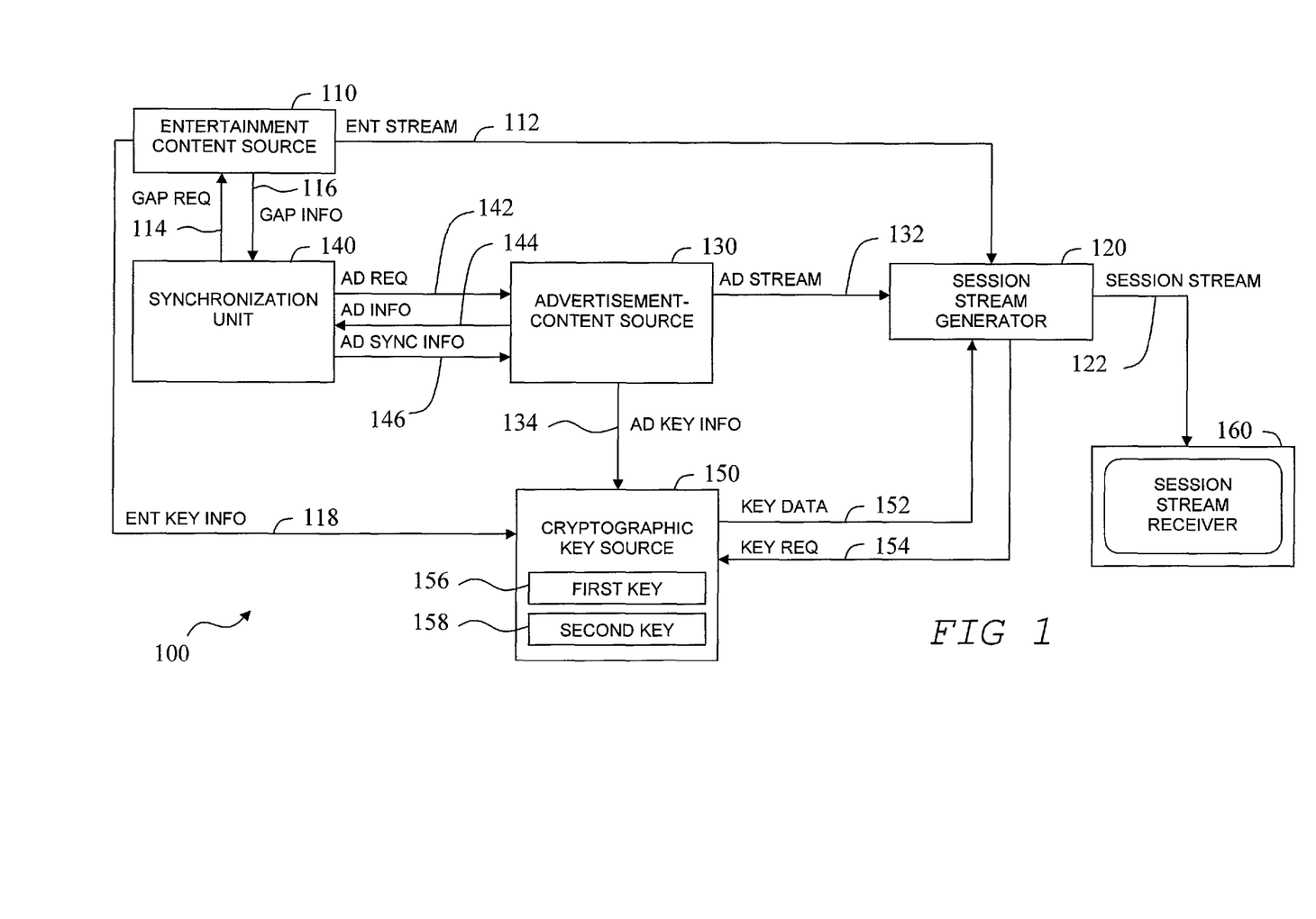
FIG. 1 is block diagram view of a stream splicing system, according to an example embodiment.

FIG. 1 is block diagram view of a stream splicing system 100, according to an example embodiment. System 100 may include an entertainment content source 110 configured to provide an entertainment stream 112 to a session stream generator 120, an advertisement content source 130 configured to provide an advertisement stream 132 to session stream generator 120, a synchronization unit 140 configured to provide synchronization between entertainment content source 110 and advertisement content source 130, and a cryptographic key source 150 configured to provide one or more cryptographic keys 152 to session stream generator 120. In this manner, session stream generator 120 receives entertainment stream 112, advertisement stream 132, and associated cryptographic keys 152 and generates a composite session stream 122 that is provided to a session stream receiver 160 configured to render or reproduce composite session stream 122 for one or more users. Any of entertainment content source 110, session stream generator 120, advertisement content source 130, synchronization unit 140, cryptographic key source 150, and/or session stream receiver 160 may include a suitably programmed computer processor configured to fetch, decode, and execute computer instructions and related hardware for performing some or all of the operations as herein described.

Alternatively, composite session stream 122 may be retransmitted, reencrypted, or stored for later rendering or transmission. Session stream generator 120 may decode, decrypt, and/or multiplex the incoming streams to provide composite session stream 122 that is a composite of the plurality of incoming streams. For example, entertainment stream 112 may include entertainment content such as a television show or a movie, while advertisement stream 132 may include advertising content such as one or more commercial messages for broadcast during gaps, or time windows, within the entertainment content. The gap in the entertainment content may be filled by a default ad which may be excised and replaced by the spliced ad, so the term gap does not necessarily refer to a hole or void in the entertainment stream 112. One entertainment stream 112 and one advertisement stream 132 are shown for simplicity, but this is not considered limiting. While the entertainment content carried by entertainment stream 112 may be targeted at a wide audience over a large geographic area, the advertising content carried by advertisement stream 132 may be targeted at a narrow audience over a small geographic area based on one or more audience features including demographics and/or personal preferences. Further, the advertising content may depend on other factors including time or date of broadcast, contracted frequency of ad presentation, and/or constraints on ad repetition, for example.

Either or both of the entertainment stream 112 and the advertisement stream 132 may conform to a real-time transport protocol (RTP) such as that described by a document titled "RTP: A Transport Protocol for Real-Time Applications" and referenced as Internet Engineering Task Force (IETF) Request For Comments (RFC) 3550 and referenced as IETF-RFC 3550, and/or a document titled "The Secure Real-time Transport Protocol (SRTP)" and referenced as IETF-RFC 3711, and/or a document titled "SDP: Session Description Protocol" and referenced as IETF-RFC4566, the content of which are hereby incorporated by reference. Other communication protocols may be used.

RTP (IETF RFC 3550) includes a "contributing source" construct that can be applied to distinguish ads from encrypted TV content. A "synchronization source" identifier called an "SSRC" uniquely identifies each RTP stream. In RTP, each SSRC is included in a mixed RTP packet and called a "contributing synchronization source" or "CSRC". However, there is no method in RTP or SRTP by which to similarly multiplex the keys or to signal null encryption for the different CSRCs. When encrypted, these media are typically "pre-encrypted" or encrypted above the RTP layer and this poses a challenge for synchronizing the encryption of separate streams. One or more embodiments may model ad splicing as an operation of an RTP mixer, whereby two or more input RTP streams are processed to produce an output stream that retains the identifying information of what parts of the output came from which input(s), and in particular may include the CSRC as a key element of the identifying information.

As described, the custom ad may be retained as a recognizable, separate block of content that is either encrypted with its own key or is unencrypted, and where the custom ad may be explicitly identified at the packet level. In an RTP environment, the custom ad packets may be identified through SSRCs/CSRCs to allow binding of keys from the key distribution system (GDOI keys) to the identifier in an unambiguous way so that a receiver can determine on a packet-by-packet basis which CAS scheme and corresponding decryption key to use with the content. Both entertainment content source 110 and advertisement content source 130 may preferably send a separate RTP stream to session stream generator 120 corresponding to a single RTP session, where each stream (112, 132) is pre-encrypted using a different encryption key. In this manner, the media elements of a particular stream may be encrypted prior to assembly into protocol compliant packets (i.e. packetization). In one embodiment, neither the entertainment content nor the advertising content is encrypted. Alternatively, only one of the streams may be encrypted while the other stream is not encrypted, or one of the streams may be integrity-protected (i.e. by using checksum and/or hash values) but not encrypted. Integrity protection may include the use of a secure hash algorithm described by a document titled "HMAC: Keyed-Hashing for Message Authentication" and referenced as IETF-RFC2104, the content of which is incorporated by reference. In particular, Hashed Message Authentication Code-Secure Hash Algorithm (HMAC-SHA1) may be used for message authentication. In yet another alternative, both the entertainment content and the advertisement may be encrypted.

The encrypted media elements of each stream may be received, decrypted, and multiplexed in session stream generator 120, which may be co-resident with or contained within a set-top box (STB). In some circumstances, generator 120 (i.e. splicer or RTP mixer) may need to decrypt the original content in order to find one or more splice points. A media content provider, such as an internet media distributor or cable company, may sell or lease a STB unit to a homeowner, where the encrypted media stream is provided to the STB, and the STB provides an encrypted media output (i.e. video/audio/text) that is displayed to a user on a television set, a video monitor, and/or an audio output device such as a stereo or entertainment center. The encrypted output may use High-Definition Content Protection for Multimedia Interface (MMI) for high definition video or Digital Visual Interface (DVI).

Synchronization unit 140 may identify or select entertainment content source 110 as a provider of entertainment content and request gap information by asserting a gap request 114 to entertainment content source 110 requesting information about one or more available periods for inserting advertisement content, or gaps, in entertainment stream 112. Gap request 114 may be communicated via a signal or bus having a predetermined signal value that represents the request, or gap request 114 may include a numeric or character value placed in a register or series of registers that represents the request to the receiving device. For example, the numeric or character value may be asserted as field within a packet or a control field of an instruction.

Entertainment content source 110 may reply to gap request 114 by asserting gap information 116 to synchronization unit 140 providing information about the one or more available periods for inserting advertisement content in entertainment stream 112. Similarly, gap information 116 may be asserted as a signal, bus, numeric, or character value. As used herein, information transfer within an electronic device and/or electronic system, including operations such as assert, reply, request, and receive, may include any combination of electrical or optical communications means as are understood within the relevant art including the operations of a suitably programmed computer configured to fetch, decode, and execute computer instructions.

Synchronization unit 140 may also identify or select advertisement content source 130 as a provider of advertisement content and request ad information by asserting an ad request 142 to advertisement content source 130 requesting information about one or more ads available for insertion into potential gaps within entertainment stream 112. Advertisement content source 130 may similarly reply to ad request 142 by asserting ad data information 144 to synchronization unit 140 providing information about the one or more available ads, and may include information regarding duration, target audience information, etc. Demographic and/or personal preference tagging may be used, for example, where a residential settop box or personal media player is configured with demographic information including residence location, family size, family income, and age ranges. The personal preference tagging may include information based on items that were purchased recently either through the media device, or provided by another source. There is no need for this information to be transmitted over a network since the stream can be tagged and a match made at the receiving device, which could select the most appropriate ads based on these demographics or personal preferences.

Synchronization unit 140 may receive and process gap information 116 and ad information 144 and provide advertisement synchronization information 146 to advertisement content source 130. This advertisement synchronization information 146 may enable advertisement content source 130 to initialize one or more time stamps, or time base indicators, associated with the target ad, in advertisement stream 132 to coincide with a time base in entertainment stream 112 for endpoint synchronization in session stream generator 120. In this manner, the composite session stream 122 may be constructed based on a chronologically ordered assembly of information (i.e. packets or media samples—video and/or audio) from a plurality of sources, and could be conventionally termed a play list.

When any of the plurality of source streams is selectively encrypted, processing and/or assembly of composite session stream 122 may be accomplished by coordinated operations with synchronization unit 140, the cryptographic key source 150, and/or a content source (110, 130). In this manner, for encrypted entertainment content, entertainment content source 110 may provide entertainment key info 118 to cryptographic key source 150, while for encrypted advertisement content, advertisement content source 130 may provide advertisement key info 134 to cryptographic key source 150. Preferably, key management may support a group key management protocol for distributing keys based on the RTP CSRC, such as that described by a document titled "The Group Domain of Interpretation" (GDOI) and referenced as IETF-RFC3547, the content of which is incorporated by reference, and more particularly, GDOI key establishment may be described by a document titled "GDOI Key Establishment for SRTP" and referenced as draft-baugher-msec-gdoi-srtp-00.txt, the content of which are incorporated by reference. Alternatively, for the case including encrypted entertainment content, cryptographic key source 150 may provide one or more cryptographic keys using existing methods such as Entitlement Control Messages (ECMs) for content keys and Entitlement Management Messages (EMMs) for endpoint authentication/authorization keys. The cryptographic key data 152 may be provided to end systems such as session stream generator 120, session stream receiver 160, a video multiplexer, or other end point.

The key data 152 may be provided automatically, as in a key distribution, or key data 152 may be provided based on a key request 154 asserted by session stream generator 120, or other endpoint. Key data 152 may include a plurality of cryptographic keys (156, 158), where each key may be associated with one or more data streams (112, 132). In one example, first key 156 may be associated with entertainment stream 112, while second key 158 may be associated with advertisement stream 132. Alternatively, second key 158 associated with advertisement stream 132 may be a null key, meaning no encryption.

In the case where session stream generator 120 processes a single, encrypted stream, synchronization unit 140 may associate a first cryptographic key with a particular sequence of media samples (e.g. video frames or access units) in entertainment stream 112 based on a time base, while synchronization unit 140 may associate a second cryptographic key with a particular sequence of ad samples based on the time base. Stream generator 120 may select the proper decryption key from among a plurality of keys (156, 158) based on the time base of a particular media sample or packet. Alternatively, the ad content may not be encrypted, but still may be associated with the time base by synchronization unit 140. Using GDOI, a stream may be identified by both source and destination information, and the keys, or a signal that keys are not needed, may be provided to session stream receiver 160 by an extension to GDOI that supports CSRC-based key establishment for RTP contributing synchronization sources.

Figure 2:
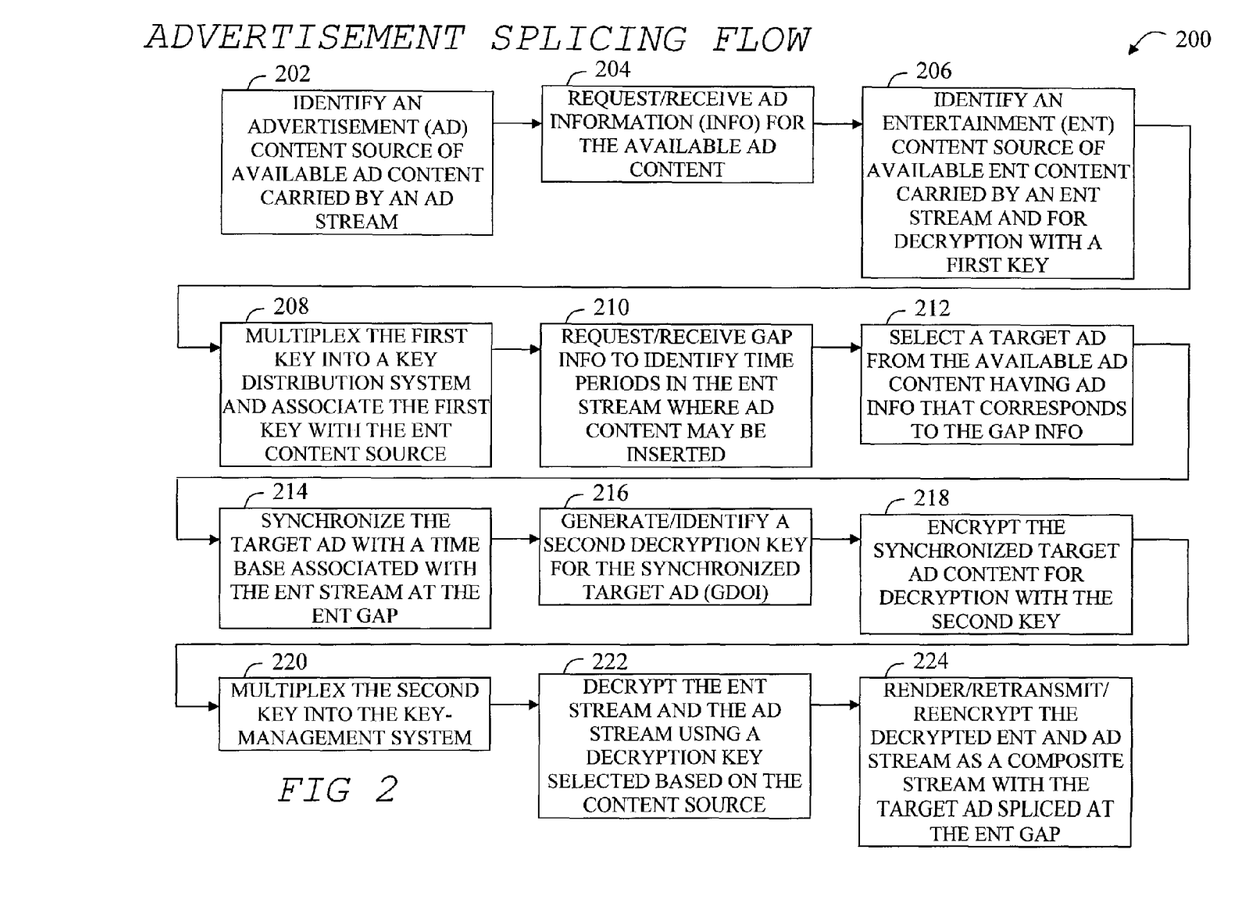
FIG. 2 is a flow diagram illustrating a multiplexing flow, according to an example embodiment.

FIG. 2 is a flow diagram illustrating a multiplexing flow 200, according to an example embodiment. In reference to FIGS. 1 and 2, flow 200 may include one or more of the following operations, identifying an advertisement (AD) content source 130 of available AD content carried by an AD stream 132 in operation 202, and requesting and/or receiving ad information (AD info) 144 for the available AD content in operation 204. Flow 200 may continue with identifying an entertainment (ENT) content source 110 for providing available ENT content that may be decrypted by a first key 156 and carried by an ENT stream 112 in operation 206. First key 156 may be available from a key distribution system that supports the ISMA Authentication and Encryption system standard ISMAcrypt for conveying decryption keys that are associated with the ENT source and the AD source. The key distribution system may include a cryptographic key source 150 for storing and retrieving a plurality of keys. If first key 156 is not already available from cryptographic key source 150, flow 200 may continue with adding or multiplexing first key 156 into the key distribution system by storing key 156 in cryptographic key source 150 which associates the first key with the entertainment content source, in operation 208.

Flow 200 may continue with requesting and/or receiving gap info 116 for the available ENT content in operation 210. Gap info 116 may include information about the start time and duration of one or more gaps where advertisement content may be inserted, spliced, or substituted. Flow 200 may continue with selecting a target ad from the available AD content having AD info 144 that corresponds to gap info 116 in operation 212. Ad info 144 may correspond to gap info 116 when the target ad has a duration that is compatible with one or more gaps identified by gap info 116 and/or when an attribute of the target AD content matches one or more advertiser criteria. For example, synchronization unit 140 may request available AD content that is identified for use with an audience having one or more particular demographic attributes such as age, ethnicity, or prospective buying habits. In this manner, the target ad is identified as being compatible with the gap info 116.

Flow 200 may continue with synchronization unit 140 synchronizing the target ad with a time base associated with the ENT stream 112 at the identified gap, in operation 214. For example, the time base can conform to time code constructs that conform to a format such as the Society of Motion Picture and Television Engineer (SMPTE) time codes in an IETF RFC 3550 stream for carrying television and motion-picture media over Real-time Transport Protocol such as that described by a document titled "Associating Time-codes with RTP streams" and referenced as IETF Audio/Video Transport (AVT) Internet Draft document draft-ietf-avt-smpte-rtp-07.txt, the content of which is hereby incorporated by reference. The time codes may be at the resolution of a single video frame and may provide for needed adjustments when the frame count is not integral to a one-second time unit.

The referenced IETF AVT draft defines a SMPTE time base but does not define a means for multiplexing multiple streams according to a time base. In one example, the time codes for the target ad may be modified to reflect rendering the ad in a chronological order that corresponds with the identified gap. In this manner, when the ENT and AD streams are eventually merged, the time code for each packet or media sample may identify a chronological order. The modification of the AD stream time codes may correspond to distributing timing information to the advertisement content source 130 through AD sync info 146.

Flow 200 may continue with generating and/or identifying a second key 158 configured to decrypt the synchronized target ad in operation 216. While in the preferred embodiment, only the ENT content is encrypted, an encryption key may be associated with the AD content so that all of the content is actually encrypted, and the session stream generator may perform the same operation of decryption and rendering the media stream in order to provide backward compatibility for using legacy customer premises equipment (CPE). In one example, a null decryption key may be used, where the ad is not actually encrypted, but a null key may be used to facilitate continuity in operation and delays through the system. The concept of a "null encryption/decryption key" is a means by which a key distribution system may identify the content is not encrypted, and therefore requires no decryption operation.

When the synchronized target ad will be decrypted using an actual decryption key, flow 200 may continue with encrypting the synchronized target AD content for decryption with second key 158 in operation 218, and multiplexing the second key in the key management system in operation 220. When the synchronized target ad will be decrypted using second key 158, the unencrypted AD content must first be encrypted using a compatible encryption key corresponding to decryption with second key 158. While symmetric encryption systems using the same key for encryption and decryption may be used, this is not considered limiting since a corresponding asymmetric encryption key may be used that provides the encrypted AD content may be decrypted by second key 158. Such an encryption key may be available through the key distribution system and/or cryptographic key source 150.

Flow 200 may continue with decrypting the ENT stream 112 and the synchronized target ad in the AD stream 132 using an appropriate decryption key (156, 158) selected based on the content or contributing source (CSRC) information in the packet that identifies a content source with a decryption key or null encryption in operation 222. In this manner, session stream generator 120 may then select the proper key 152 from the key management stream or distribution system based on the source of the stream and chronological ordering of frames, packets, or samples and decrypt both the entertainment stream 112 and the chronologically ordered advertisement stream 132 with a cryptographic key selected based on the source in the ENT content and the source in the synchronized target ad.

Finally, flow 200 may conclude with at least one of rendering, retransmitting, and/or reencrypting the decrypted ENT and AD streams as a composite stream with the synchronized target ad spliced or inserted into the gap in ENT stream 132, in operation 224. In this same manner, remaining gaps in the ENT content stream 112 may be filed with appropriate AD content. Alternatively, not all gaps may be filled, so that the composite stream may include one or more remaining gaps that may be filled with spliced ads at a later time in a serial manner.

The manner in which cryptographic key source 150 presents keys to an end system or session stream generator 120 can vary. In the ISMA MPEG-4 Encryption and Authentication system, key rotation is signaled by a "key indicator" that can be up to 128 bytes in length through it is typically much shorter. In the preferred embodiments, a key distribution system based on IETF-RFC3547 may allocate decryption keys or null keys based on the identification of the source of the content that is multiplexed in the SRTP packet. Other embodiments may associate use of a cryptographic key with a SMPTE time code or a range of time codes.

As described, it is the end system or session stream generator 120 where the keys are applied to the content for decryption and rendering. Alternatively, a composite session stream 122 may be reencrypted and/or retransmitted to another receiver for decryption at a later stage. In one embodiment, the ENT and AD streams may be multiplexed onto a single MPEG-2 Transport Stream (TS) in their encrypted form and sent as one MPEG-2 TS. The streams may be multiplexed into a single RTP packet where each SSRC is identified as a Contributing Source (CSRC) in the packet. In this manner, ad splicing may be accomplished without manipulating the entertainment content itself, or the MPEG encoding thereof, by exploiting a multiple source capability of RTP media transport, Secure RTP (SRTP) encapsulation. Embodiments may receive and/or transmit data or in a manner that conforms with a standard protocol including RTP, SRTP, GDOI, and ISMACrypt, however these should be considered as examples and not limitations.

Figure 3:
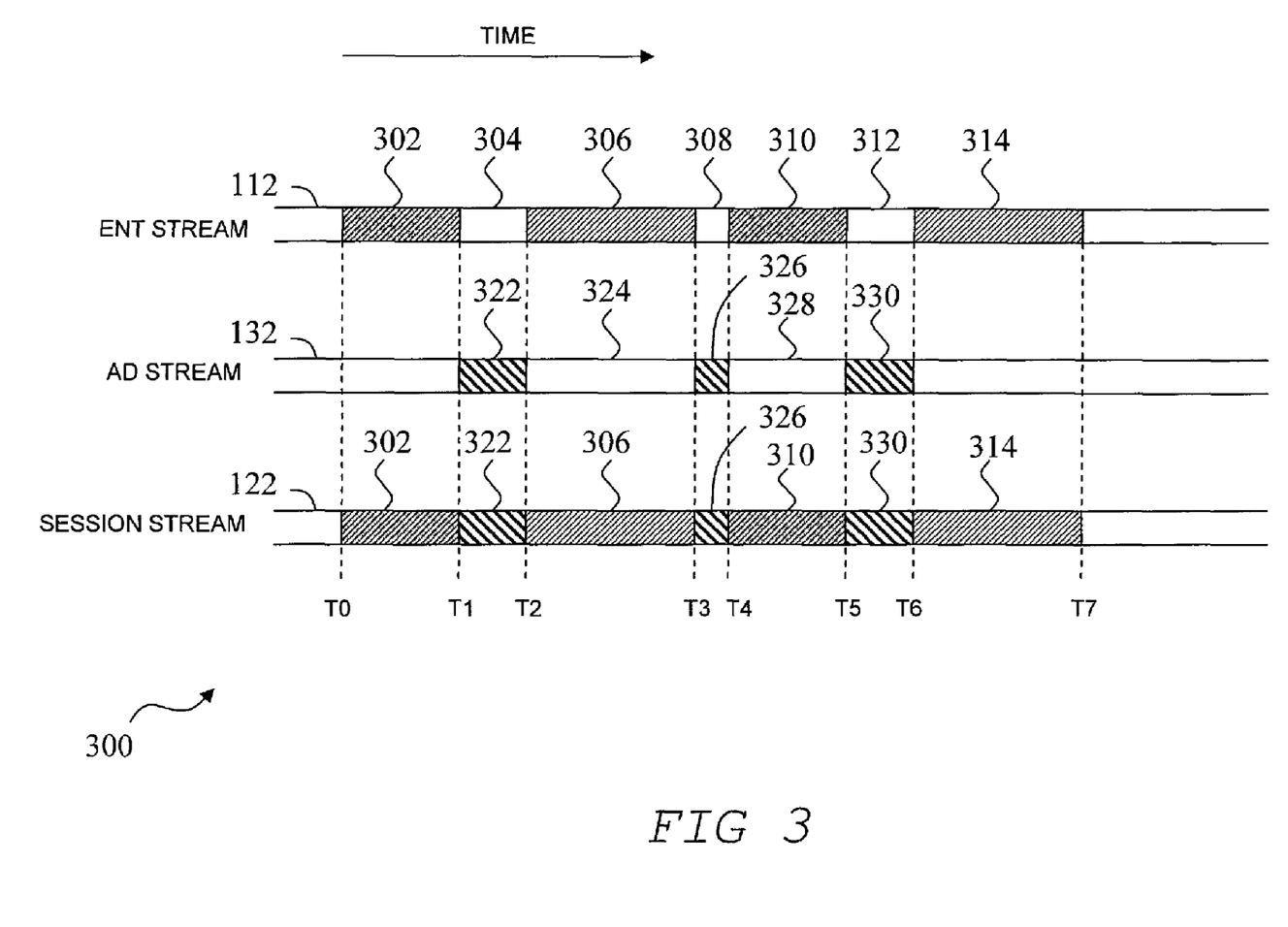
FIG. 3 is a timeline diagram graphically illustrating the composition of a composite session stream, according to an example embodiment.

FIG. 3 is a timeline diagram 300 graphically illustrating the composition of a composite session stream 122, according to an example embodiment. In reference to FIGS. 1-3, an entertainment stream 112 may include entertainment content portions (302, 306, 310, and 314) separated by gaps (304, 308, 312), or available periods in the entertainment stream where advertisement content may be spliced or inserted. In like manner, an AD stream 132 may include advertisement content portions (322, 326, 330) separated by gaps (324, 328), or time between advertisement content portions. Each of the content portions may be synchronized according to the AD stream source or the ENT stream source so that decryption and/or assembly of the constituent parts of the resulting composite stream may be chronologically ordered.

Entertainment stream content portion 302 may be ordered between time T0 and time T1, entertainment content portion 306 may be ordered between time T2 and time T3, entertainment content portion 310 may be ordered between time T4 and time T5, and entertainment content portion 314 may be ordered between time T6 and time T7, where time may be measured in seconds of clock time or frame time units based on the number of media samples per second, for example. Advertisement content portion 322 may be ordered between time T1 and time T2 corresponding to gap 304 in entertainment stream 112, advertisement content portion 326 may be ordered between time T3 and time T4 corresponding to gap 308 in entertainment stream 112, and advertisement content portion 330 may be ordered between time T5 and time T6 corresponding to gap 312 in entertainment stream 112.

A first cryptographic key associated with a first time interval T0-T1 and the ENT stream source may be used to decrypt entertainment content portion 302, and apply the decrypted entertainment content portion 302 to composite session stream 122. Similarly, a second cryptographic key associated with the AD stream source and a second time interval T1-T2 may be used to decrypt advertisement content portion 322, and apply the decrypted advertisement content portion 322 to composite session stream 122. In this manner, a plurality of source streams may be decrypted and merged into a composite session stream 122. While delays through a physical system may cause the time-frame shown for each stream in FIG. 3 to be shifted, each of the constituent source streams and the composite stream are aligned to more clearly show the interstitial nature of the decryption and assembly process.

Alternatively, the advertisement content may be unencrypted, or may have null encryption, where a null decryption key may be used to pass the advertisement content through as unencrypted data. While a preferred embodiment includes encrypted entertainment content and unencrypted advertisement content, any of a plurality of source streams (entertainment/advertisement) may be encrypted or unencrypted. Either or both of the advertisement content and the entertainment content may be compressed as a single, uninterrupted stream where the content is transferred each as a single stream and then assembled into a composite stream based on the time base.

It should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

We claim:

1. A method, comprising:

providing at least one processor and using the at least one processor for:

receiving gap information from an entertainment content source configured to provide an entertainment stream associated with a first contributing source of information and a first key indicator providing a source of the entertainment stream and a chronological order to render the entertainment stream, the entertainment stream being encrypted and having an associated first decryption key multiplexed into a key distribution system,
the gap information identifying a gap in the entertainment stream within which an ad may be one of inserted or substituted;
synchronizing a target ad from an advertisement stream to a time base corresponding to the gap;
generating a second generating a second decryption key for the synchronized target ad, the target ad being associated with a second contributing source of information and a second key indicator;
multiplexing the second key into the key distribution system;
encrypting the synchronized target ad so that the target ad may be decrypted using the second key;
rendering the entertainment stream and the target ad as a composite stream based on the chronological order, the target ad being rendered during the gap in the entertainment stream;
decrypting the entertainment stream using the first decryption key selected from the key distribution system based on the first contributing source of information and the first key indicator; and,
decrypting the target ad using the second decryption key selected from the key distribution system based on the second contributing source information and the second key indicator.

2. The method of claim 1, wherein the entertainment content includes a sequence of media samples that are transmitted according to a real time protocol, the media samples including at least one of a video sample or an audio sample.

3. The method of claim 2, wherein
the real time protocol conforms to one of a real time protocol (RTP) IETF-RFC 3550 or a secure real time protocol (SRTP) IETF-RFC 3711, and
the time base conforms to Society of Motion Picture and Television Engineer (SMPTE) time codes associated with the RTP or the SRTP.

4. The method of claim 3, wherein the entertainment stream is encrypted above the real time protocol layer.

5. The method of claim 1, wherein at least one of the entertainment stream and the advertisement stream comprises at least one of a sequence of packets or a sequence of media samples.

6. The method of claim 1, wherein the key distribution system supports Group Domain of Interpretation (GDOI).

7. The method of claim 6, wherein the key distribution system supports GDOI and is used to bind a decryption key to a source identifier of an associated stream and key indicator.

8. The method of claim 1, wherein the operation of synchronizing the target ad from an advertisement stream to the time base corresponding to the gap information to render the target ad during the gap is repeated for a plurality of entertainment stream gaps.

9. The method of claim 1, wherein the target ad is selected from the advertisement stream based on at least one of demographics or preferences of a target audience for rendering the composite stream.

10. An apparatus, comprising:
a cryptographic key source, including at least one processor and means for storing data, configured to receive, store and supply one or more keys including a first key and a second key; and,
a synchronization unit, including at least one processor, configured to receive gap information from an entertainment content source configured to provide an entertainment stream associated with a contributing source of information and a first key indicator providing a source of the entertainment stream and a chronological order for rendering the entertainment stream,
the entertainment stream being encrypted and configured for decryption using the first key,
the gap information identifying a gap in the entertainment stream where an ad may be one of inserted or substituted,
the synchronization unit being configured to receive ad information from an advertisement content source identifying at least the duration of a target ad,
the advertisement content source including a target ad having ad information that is compatible with the gap information,
the target ad being associated with the advertisement content source and a second key indicator and configured for decryption using the second key,
the synchronization unit being configured to provide ad sync information for modifying the chronological order of the target ad to coincide with the gap,
the first key being selected from the cryptographic key source and used to decrypt the entertainment stream based on the source of the entertainment stream and the first key indicator,
the second key being selected from the cryptographic key source and used to decrypt the target ad based on the advertisement content source and the second key indicator,
wherein a composite stream of the decrypted entertainment stream and the target ad is rendered based on the chronological order, the target ad being rendered during the gap in the entertainment stream.

11. The apparatus of claim 10, further comprising:
a session stream generator configured to receive separate entertainment and advertisement streams and render a composite stream wherein the target ad from the advertisement stream is spliced into the entertainment stream gap.

12. The apparatus of claim 11, wherein the apparatus comprises a settop box.

13. The apparatus of claim 10, wherein the entertainment content includes a sequence of media samples that are transmitted according to a real time protocol, the real time protocol supporting at least one of a real time protocol (RTP) IETF-RFC 3550 or a secure real time protocol (SRTP) IETF-RFC 3711.

14. The apparatus of claim 10, wherein the cryptographic key source comprises a key distribution system that supports Group Domain of Interpretation (GDOI).

15. The apparatus of claim 14, wherein the key distribution system supports GDOI and is used to bind a decryption key to a source identifier of an associated stream.

16. The apparatus of claim 10, wherein the target ad is selected from an advertisement stream based on at least one of demographics or preferences of a target audience for rendering the composite stream.

17. An apparatus, comprising:
a key distribution means for providing one or more cryptographic keys including a first key and a second key, the key distribution means supporting Group Domain of Interpretation (GDOI); and,
a synchronization means for receiving gap information from an entertainment content source configured to provide an entertainment stream associated with a contributing source of information and a key indicator providing a source of the entertainment stream and a chronological order for rendering the entertainment stream, the entertainment stream being encrypted and configured for decryption using the first key, the gap information identifying a gap in the entertainment stream where an ad may be one of inserted or substituted, the synchronization means receiving ad information from an advertisement content source identifying at least the duration of a target ad, the advertisement content source including a target ad having ad information that is compatible with the gap information, the target ad being encrypted and associated with the advertisement content source and a second key indicator and configured for decryption using the second key, the synchronization means providing ad sync information for modifying the chronological order of the target ad to coincide with the gap, the first key being selected from a cryptographic key source and used to decrypt the entertainment stream based on the source of the entertainment stream and the first key indicator, the second key being selected from a cryptographic key source and used to decrypt the target ad based on the advertisement content source and the second key indicator, the GDOI being used to bind a decryption key to a source identifier of an associated stream, wherein a composite stream of the decrypted entertainment stream and the target ad is rendered based on the chronological order, the target ad being rendered during the gap in the entertainment stream.

* * * * *